United States Patent
Mueller et al.

(10) Patent No.: US 9,002,402 B2
(45) Date of Patent: Apr. 7, 2015

(54) SYSTEM FOR DETECTING USAGE OF A WIRELESS PHONE IN AN AUTOMOBILE

(75) Inventors: Paul Anthon Mueller, St. Clair Shores, MI (US); Gregory William Farrey, Ypsilanti, MI (US); Tye Arthur Winkel, Canton, MI (US); Thomas Joseph Hermann, Troy, MI (US); John Dolinsky, Ann Arbor, MI (US); Thomas Eric Svenson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/616,645

(22) Filed: Sep. 14, 2012

(65) Prior Publication Data

US 2014/0080543 A1   Mar. 20, 2014

(51) Int. Cl.
*H04B 1/38* (2006.01)
*H04W 4/00* (2009.01)
*H04W 4/20* (2009.01)

(52) U.S. Cl.
CPC .............. *H04W 4/001* (2013.01); *H04W 4/206* (2013.01)

(58) Field of Classification Search
CPC .... B60R 1/12; H04M 1/6091; H04M 1/6066; H04M 1/72519
USPC ................ 455/569.2, 569.1, 550.1, 418, 557; 340/425.5
See application file for complete search history.

(56) References Cited

U.S. PATENT DOCUMENTS

| | | | |
|---|---|---|---|
| 6,262,657 B1 | 7/2001 | Okuda et al. | |
| 7,474,264 B2 * | 1/2009 | Bolduc et al. | 342/463 |
| 7,646,312 B2 | 1/2010 | Rosen | |
| 2007/0229234 A1 | 10/2007 | Smith | |
| 2010/0197359 A1 | 8/2010 | Harris | |
| 2011/0080274 A1 * | 4/2011 | Reed et al. | 340/425.5 |
| 2011/0105097 A1 | 5/2011 | Tadayon et al. | |
| 2011/0183601 A1 | 7/2011 | Hannon | |
| 2011/0207448 A1 * | 8/2011 | Chen et al. | 455/418 |
| 2011/0219080 A1 * | 9/2011 | McWithey et al. | 709/206 |
| 2011/0300843 A1 * | 12/2011 | Miller et al. | 455/418 |

FOREIGN PATENT DOCUMENTS

| | | | |
|---|---|---|---|
| KR | 20000074382 A | 12/2000 | |
| WO | 2006070168 A1 | 7/2006 | |
| WO | 2007135488 A1 | 11/2007 | |

* cited by examiner

*Primary Examiner* — Danh Le
(74) *Attorney, Agent, or Firm* — Jennifer M. Stec; Brooks Kushman P.C.

(57) ABSTRACT

A vehicle includes a detection module including a directional antenna and signal processing logic. The detection module is located within the vehicle, arranged with respect to a driver region, and configured to detect a condition wherein a wireless phone is operated within the driver region. The detection module generates an output indicative of the detected condition. The vehicle further includes a controller configured to receive the output, and control the vehicle in response to the detected condition.

18 Claims, 3 Drawing Sheets

US 9,002,402 B2

SYSTEM FOR DETECTING USAGE OF A WIRELESS PHONE IN AN AUTOMOBILE

TECHNICAL FIELD

The invention relates to detecting usage of a wireless phone in an automobile.

BACKGROUND

The use of wireless phones in automobiles has become widespread. A vehicle occupant may use a traditional wireless phone while in an automobile. A vehicle occupant may also use any one of a number of handsfree phone systems which have become available in recent years.

In certain situations, it may be desirable to detect usage of a wireless phone in an automobile.

Background information may be found in U.S. Pat. Nos. 6,262,657 and 7,646,312. Further background information may be found in U.S. Pub. Nos. 2007/0229234 and 2010/0197359. Further background information may be found in KR20000074382, WO2006070168, and WO2007135488.

SUMMARY

In one embodiment of the invention, a vehicle comprises a detection module and a controller. The detection module includes a directional antenna and signal processing logic. The detection module is located within the vehicle, arranged with respect to a driver region, and configured to detect a condition wherein a wireless phone is operated within the driver region. The detection module generates an output indicative of the detected condition. The controller is configured to receive the output, and control the vehicle in response to the detected condition.

At the more detailed level, various embodiments of the invention may include one or more additional features depending on the application. For example, in one possible feature, the controller is further configured to transmit a signal to disable the wireless phone in response to the detected condition. In another possible feature, the controller is further configured to determine when the vehicle is in motion, and to transmit a signal to disable the wireless phone in response to the detected condition when the vehicle is in motion.

In another possible feature, the controller is further configured to transmit an association request to the wireless phone in response to the detected condition and configured to receive a response from the wireless phone. The controller is further configured to associate with the wireless phone upon receipt of the response from the wireless phone.

In another feature, the controller is further configured to determine when the vehicle is in motion, and to transmit an association request to the wireless phone in response to the detected condition when the vehicle is in motion. The controller is further configured to receive a response from the wireless phone and associate with the wireless phone upon receipt of the response from the wireless phone.

The controller may be configured to, upon association of the controller with the wireless phone, permit a vehicle audio system to be utilized by the wireless phone during continued operation of the wireless phone.

In another aspect of the invention, the directional antenna and signal processing logic may be arranged to detect the condition wherein the wireless phone is operated within the driver region by sensing radio frequency transmission power in the driver region above a predetermined threshold.

It is appreciated that embodiments of the invention relate to detecting usage of a wireless phone in an automobile. Various actions may be taken upon the detection, and the appropriate action may vary depending on the application. For example, in one particular application, the controller is further configured to produce an output observable by the driver in response to the detected condition.

In some embodiments, the detection module may include a single directional antenna. In other embodiments, the detection module may include a plurality of directional antennas located at separated locations within the vehicle.

In another embodiment of the invention, a vehicle comprises a detection module including a directional antenna and signal processing logic. The detection module is located within the vehicle, arranged with respect to a driver region, and configured to detect a condition wherein a wireless phone is operated within the driver region, and to generate an output indicative of the detected condition. A controller is configured to receive the output, and control the vehicle in response to the detected condition. The directional antenna and signal processing logic are arranged to detect the condition wherein the wireless phone is operated within the driver region by sensing radio frequency transmission power in the driver region above a predetermined threshold. The controller is further configured to perform at least one of (i) transmit a signal to disable the wireless phone in response to the detected condition, (ii) associate with the wireless phone in response to the detected condition.

In yet another embodiment, a vehicle comprises a detection module including a plurality of directional antennas located at separated locations within the vehicle and signal processing logic. The detection module is located within the vehicle, arranged with respect to a driver region, and configured to detect a condition wherein a wireless phone is operated within the driver region, and to generate an output indicative of the detected condition. A controller is configured to receive the output, and control the vehicle in response to the detected condition. The directional antennas and signal processing logic are arranged to detect the condition wherein the wireless phone is operated within the driver region by sensing radio frequency transmission power in the driver region above a predetermined threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
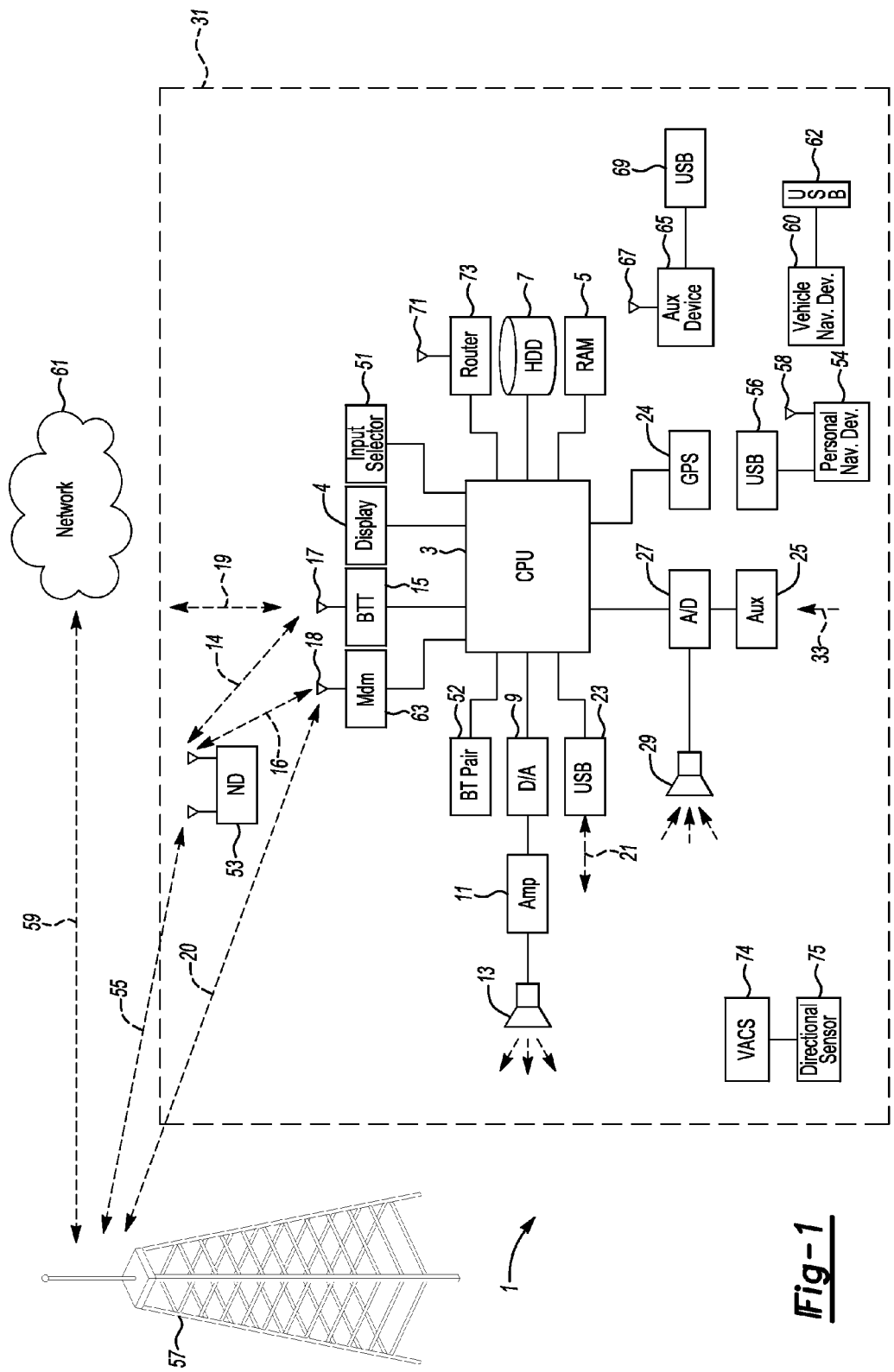
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor 3 is also provided with a number of different inputs allowing the user to interface with the processor 3. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 Mbs for stationary or walking users and 385 kbs for users in a moving vehicle. 3G standards are now being replaced by IMT-Advanced (4G) which offers 100 Mbs for users in a vehicle and 1 Gbs for stationary users. If the user has a data-plan associated with the nomadic device, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (CENTRONICS Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS) 74. In certain embodiments particular components of the VACS 74 may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself One of ordinary skill in the art will understand when it is inappropriate to apply a particular VACS 74 to a given solution. In all solutions, it is contemplated that at least the vehicle computing system (VCS) located within the vehicle itself is capable of performing the exemplary processes.

Further referring to FIG. 1, a detection module implemented as directional sensor 75 is in communication with a controller, implemented as vehicle associated computer system (VACS) 74. Directional sensor 75 includes a directional antenna and signal processing logic. Directional sensor 75 is located within the vehicle, arranged with respect to the driver region, and configured to detect a condition wherein a wireless phone is operated within the driver region. Directional sensor 75 generates an output indicative of the detected condition. The output is received by VACS 74. VACS 74 controls the vehicle in response to the detected condition.

It is appreciated that the detection module and controller may be implemented in a variety of ways. In general, the system determines if a wireless phone is being used, and if so, the controller (for example, VACS 74 and/or VCS 1) takes an appropriate action. An example action for the controller is to transmit a signal to disable the wireless phone in response to the detected phone-in-use condition. Another example action is to cause an association request to be transmitted to the wireless phone in response to the detected phone-in-use condition. VACS 74 or VCS 1 receives a response from the wireless phone, and the controller associates with the wireless phone.

The disabling of the wireless phone or the association of the wireless phone may be conditioned on the vehicle being in motion when the phone-in-use condition is detected. That is, VACS 74 or VCS 1 determines when the vehicle is in motion, and then takes appropriate action in response to the detected condition when the vehicle is in motion.

In another feature, VACS 74 or VCS 1 may be configured to, upon association with the wireless phone, permit a vehicle audio system to be utilized by the wireless phone during continued operation of the wireless phone. In another feature, VACS 74 or VCS 1 may produce an output observable by the driver (audible or visible) in response to the detected phone-in-use condition, or may take any other action deemed appropriate for the application such as issuing a verbal or HUD notification or other indication. As well, the phone-in-use condition may be triggered by a variety of phone uses such as talking, texting, or data transfer.

In another feature, the detection module may be implemented with a plurality of directional antennas located at separated locations within the vehicle.

Figure 2:
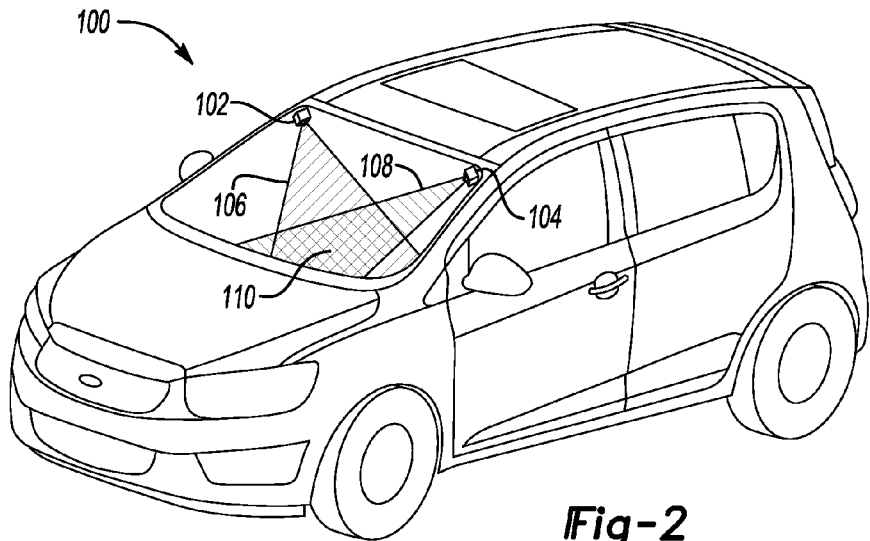
FIG. 2 is a diagram of a vehicle equipped with a wireless-phone detection system.

In FIG. 2, a diagram of a vehicle equipped with a wireless-phone detection system is shown. The vehicle 100 has directional sensor 102 and directional sensor 104. Directional sensor 102 is configured with a directional antenna to monitor region 106, while directional sensor 104 is configured with a directional antenna to monitor region 108. The regions overlap at 110. The directional antennas may be located anywhere on the vehicle such that they can be used to determine the location of the wireless phone. In this particular embodiment, the directional sensors 102 and 104 are arranged so as to be point tuned on the driver. Upon detection of the phone-in-use condition, VACS 74 (or VCS 1) could send a message to the wireless phone to terminate the signal (disable the phone). Alternatively, VACS 74 (or VCS 1) could attempt to associate the wireless phone with the vehicle's BLUETOOTH system.

Figure 3:
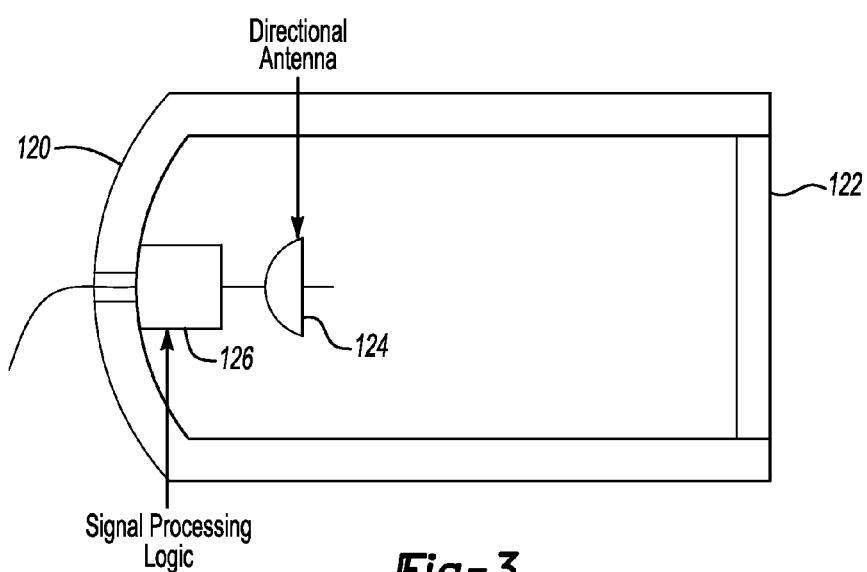
FIG. 3 is a cross-sectional diagram of a directional sensor.

FIG. 3 depicts a cross-sectional diagram of a directional sensor. The assembly, in this illustrated embodiment, includes a tuned can or waveguide 120 to filter out cell tower signals, and a tuned polarized filter 122 to filter out non-cell phone signals and to provide improved localization of signal input to the interior of the vehicle. A directional antenna 124 is recessed within the can 120, and the signal processing logic is implemented in any suitable manner at 126. A three wire pigtail feeds through the end of can 120, and may include a power wire (5VDC), signal wire (0-5VDC), and ground wire. In more detail, the tuned can 120 and polarized filter 122 are designed to suppress signals and noise emanating from outside the vehicle. This allows the sensor to know the signal, if detected, is from the interior of the vehicle.

Figure 4:
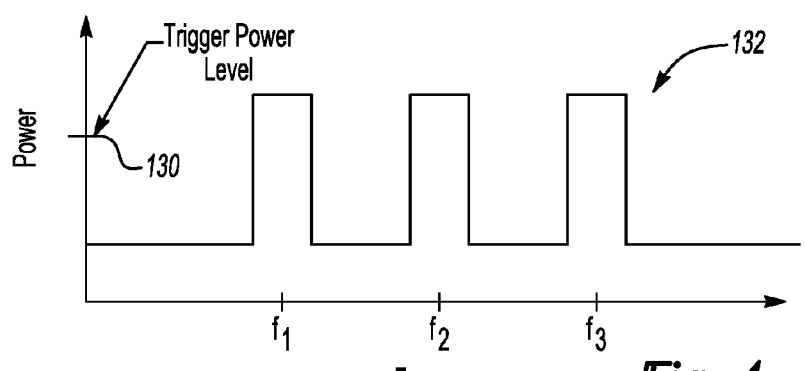
FIG. 4 illustrates operation of a tuned filter implemented in the signal processing logic in an example implementation.

FIG. 4 illustrates operation of a tuned filter implemented in the signal processing logic in an example implementation. Wireless phone operation within the driver region is detected by sensing radio frequency transmission power in the driver region above a predetermined threshold. FIG. 4 depicts a graph of power versus frequency and depicts the trigger power level 130 and an example filter having components at frequencies $f_1$, $f_2$, and $f_3$. In more detail, in this example, the tuned filter is used to detect the power spike from speaking on a cell phone at specific tunable frequencies. Power levels at a specified frequency that are higher than a pre-set limit may trigger the signal voltage on the sensor to go from zero to a non-zero value. This can alert the directional sensor that there is a signal that has a desired frequency (a wireless phone frequency). The VACS 74 will then take appropriate action after detecting usage of a wireless phone.

Figure 5A:
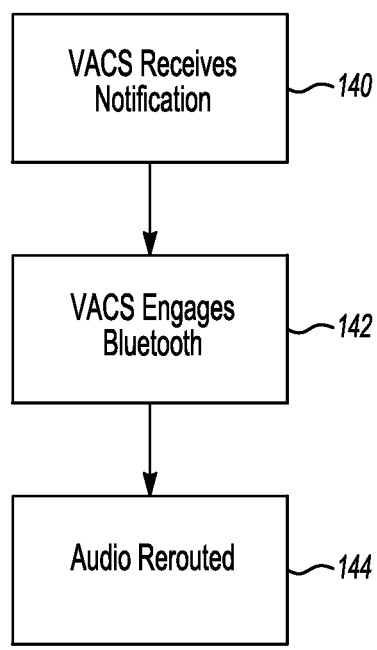
FIG. 5A is a flow chart indicating the actions that the VACS system takes after detecting usage of a mobile phone in the driver region.

FIG. 5A is a flow chart indicating the actions that the VACS system takes after detecting usage of a mobile phone in the driver region. In operation 140, the VACS system 74 receives notification from the directional sensor 75 that a wireless phone is being used in the driver's region. In operation 142, the VACS system 74 engages the BLUETOOTH to pair the wireless phone (nomadic device 53) with the VACS 74. The VACS system 74 may interface with the vehicle audio system.

The VACS system 74 interfaces with the vehicle's audio system by transmitting a signal to the audio system. The audio system then routes the signal through its speakers that are located in the vehicle. In operation 144, once the nomadic pairing between the wireless phone and the VACS 74 has occurred, audio may be rerouted through the vehicle audio system.

Figure 5B:
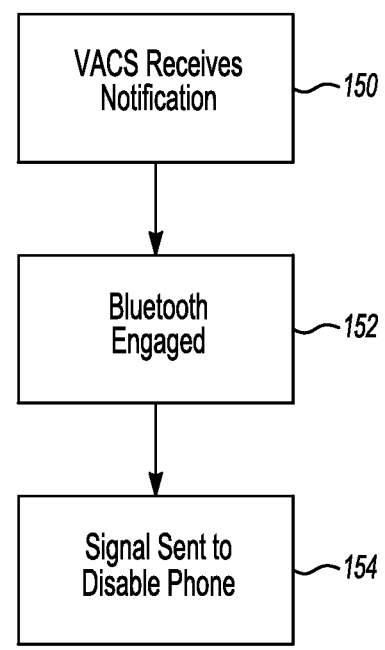
FIG. 5B is flow chart indicating an alternative embodiment for the VACS system when it detects a cell phone signal within the driver region.

FIG. 5B is flow chart indicating an alternative embodiment for the VACS system when it detects a cell phone signal within the driver region. In operation 150, the VACS system 74 receives notification from the directional sensor 75 that a wireless phone is being used in the driver's region. In operation 152, the VACS system 74 engages the BLUETOOTH to pair the wireless phone (nomadic device 53) with the VACS 74. In operation 154, the BLUETOOTH transmits a signal to either disconnect the call or alternatively mute the call.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a detection module including processing logic and a directional antenna, in the vehicle adjacent a driver region, configured to detect a condition wherein a wireless phone is operated within the region, and generate output indicating the condition; and
    a controller configured to receive the output and responsive to the condition, control the vehicle, transmit a request to the phone, and associate with the phone upon receipt of a response to the request.

2. The vehicle of claim 1 wherein the controller is further configured to transmit a signal to disable the wireless phone in response to the detected condition.

3. The vehicle of claim 1 wherein the controller is further configured to determine when the vehicle is in motion, and to transmit a signal to disable the wireless phone in response to the detected condition when the vehicle is in motion.

4. The vehicle of claim 1 wherein the controller is further configured to, upon association of the controller with the wireless phone, permit a vehicle audio system to be utilized by the wireless phone during continued operation of the wireless phone.

5. The vehicle of claim 1 wherein the processing logic and directional antenna are configured to detect the condition by sensing radio frequency transmission power in the driver region above a predetermined threshold.

6. The vehicle of claim 1 wherein the controller is further configured to produce an output observable by the driver in response to the detected condition.

7. The vehicle of claim 1 wherein the detection module further includes a plurality of directional antennas located at separated locations within the vehicle.

8. A vehicle comprising:
    a detection module including a directional antenna and signal processing logic, the detection module being located within the vehicle, arranged with respect to a driver region, and configured to detect a condition wherein a wireless phone is operated within the driver region, and to generate an output indicative of the detected condition; and
    a controller configured to receive the output, and control the vehicle in response to the detected condition;
    wherein the directional antenna and signal processing logic are arranged to detect the condition wherein the wireless phone is operated within the driver region by sensing radio frequency transmission power in the driver region above a predetermined threshold; and
    wherein the controller is further configured to perform at least one of (i) transmit a signal to disable the wireless phone in response to the detected condition, (ii) associate with the wireless phone in response to the detected condition.

9. The vehicle of claim 8 wherein the controller is further configured to determine when the vehicle is in motion, and to transmit an association request to the wireless phone in response to the detected condition when the vehicle is in motion; and
    wherein the controller is further configured to receive a response from the wireless phone and using a short-range signal associate with the wireless phone upon receipt of the response from the wireless phone.

10. The vehicle of claim 8 wherein the controller is configured to, upon association of the controller with the wireless phone, permit a vehicle audio system to be utilized by the wireless phone during continued operation of the wireless phone.

11. The vehicle of claim 8 wherein the detection module further includes a plurality of directional antennas located at separated locations within the vehicle.

12. A vehicle comprising:
    a detection module including a plurality of directional antennas located at separated locations within the vehicle and signal processing logic, the detection module being located within the vehicle, arranged with respect to a driver region, and configured to detect a condition wherein a wireless phone is operated within the driver region, and to generate an output indicative of the detected condition;
    a controller configured to receive the output, and control the vehicle in response to the detected condition; and
    wherein the directional antennas and signal processing logic are arranged to detect the condition wherein the wireless phone is operated within the driver region by sensing radio frequency transmission power in the driver region above a predetermined threshold.

13. The vehicle of claim 12 wherein the controller is further configured to produce an output observable by the driver in response to the detected condition.

14. The vehicle of claim 12 wherein the controller is further configured to transmit a signal to disable the wireless phone in response to the detected condition.

15. The vehicle of claim 12 wherein the controller is further configured to associate with the wireless phone in response to the detected condition.

16. The vehicle of claim 12 wherein the controller is configured to, upon association of the controller with the wireless phone, permit a vehicle audio system to be utilized by the wireless phone during continued operation of the wireless phone.

17. The vehicle of claim 12 wherein the controller is further configured to determine when the vehicle is in motion, and to control the vehicle in response to the detected condition when the vehicle is in motion.

18. The vehicle of claim 12 wherein the controller is further configured to perform at least one of (i) transmit a signal to disable the wireless phone in response to the detected condition, (ii) associate with the wireless phone in response to the detected condition.

* * * * *